United States Patent
Huang et al.

(10) Patent No.: US 7,460,770 B2
(45) Date of Patent: Dec. 2, 2008

(54) UNDERWATER HOUSING FOR A MONITORING DEVICE

(75) Inventors: Kuen-Yu Huang, Hsin-Chu (TW); Yao-Tsung Wang, Kaohsiung Hsien (TW); Po-Wen Chen, Taipei (TW)

(73) Assignee: National Applied Research Laboratories National Center for High-Performance Computing, Hsinchu (TW)

( * ) Notice: Subject to any disclaimer, the term of this patent is extended or adjusted under 35 U.S.C. 154(b) by 337 days.

(21) Appl. No.: 11/403,744

(22) Filed: Apr. 12, 2006

(65) Prior Publication Data

US 2007/0242935 A1    Oct. 18, 2007

(51) Int. Cl.
*G03B 17/08*   (2006.01)
*H04N 9/47*    (2006.01)
*H04N 7/18*    (2006.01)

(52) U.S. Cl. .......................... 396/25; 348/81
(58) Field of Classification Search ........... 396/25–29; 348/81
See application file for complete search history.

(56) References Cited

U.S. PATENT DOCUMENTS 4,035,816 A * 7/1977 Winnacker ............... 396/28
2006/0263075 A1* 11/2006 Juan et al. ................ 396/29

* cited by examiner

*Primary Examiner*—Melissa Jan Koval
(74) *Attorney, Agent, or Firm*—Ladas & Parry, LLP

(57) ABSTRACT

An underwater housing for containing a monitoring device includes a tubular housing body having a front end formed with an inward flange. The inward flange has a rear side surface formed with an annular groove defined by a groove-defining wall. A transparent plate is disposed fixedly within the housing body, and is located behind and adjacent to the inward flange. An annular water seal is disposed within the annular groove and in contact with the inward flange and an outer peripheral portion of the front side surface of the transparent plate so as to establish a watertight seal between the transparent plate and the housing body. An annular cover is disposed fixedly and fittingly within the inward flange, and has a rear end in contact with the front side surface of the transparent plate and in proximity to the water seal for covering the water seal.

5 Claims, 5 Drawing Sheets

UNDERWATER HOUSING FOR A MONITORING DEVICE

BACKGROUND OF THE INVENTION

1. Field of the Invention

This invention relates to an underwater housing, and more particularly to an underwater housing for containing a monitoring device, such as a photographic camera, that provides monitoring for long periods of time.

2. Description of the Related Art

Referring to FIGS. 1 and 2, a conventional underwater housing 1 for containing a photographic camera (not shown) includes a tubular housing body 11, a seal cap 12 connected fixedly to a rear end of the housing body 11 so as to define an accommodating space 10 for receiving the photographic camera, a transparent plate 13, a positioning member 14, and a water seal 15. The photographic camera can be used to monitor living creatures (e.g., fish) via the transparent plate 13.

The housing body 11 has a surrounding wall 16 and an annular front end wall 17 formed with an internally threaded portion 171 and a central opening 172. The photographic camera is disposed within the surrounding wall 16. An inward flange 170 extends radially and inwardly from a front end of the front end wall 17, and has a rear side surface formed with an annular groove 173 for receiving the water seal 15. The positioning member 14 has an externally threaded outer periphery engaging the internally threaded portion 171 of the housing body 11. The transparent plate 13 is clamped between the positioning member 14 and the water seal 15. The water seal 15 is in contact with the transparent plate 13 and the inward flange 170 so as to establish a watertight seal between the transparent plate 13 and the housing body 11. An electrical cable 18 extends sealingly through the seal cap 12, and is coupled electrically to the photographic camera.

Typically, the underwater housing 1 is placed at a specific location underwater for more than six months. Since an annular gap is formed between the transparent plate 13 and the inward flange 170, algae easily grow on a front side surface of the transparent plate 13, as shown in FIG. 2. This adversely affects the quality of the images obtained by the photographic camera.

To remove the algae on the transparent plate 13, it is necessary to first take the housing 1 out of water to gain access to the transparent plate 13. Alternatively, a diver or snorkeler may swing underwater to the housing 1 to shave off the algae and scrub the front side surface of the transparent plate 13 using tools. However, in either case, since algae multiply at an extremely fast pace, the labor costs involved in ensuring that the transparent plate 13 remains algae-free are high.

SUMMARY OF THE INVENTION

The object of this invention is to provide an underwater housing for containing a monitoring device that is used for a long period at a set location underwater, in which the underwater housing can prevent algae growth on a transparent plate.

According to this invention, an underwater housing for containing a monitoring device includes:

a tubular housing body having an open front end formed with an inward flange extending radially and inwardly therefrom, and an open rear end, the inward flange having a rear side surface formed with an annular groove defined by a groove-defining wall;

a seal cap connected fixedly to the rear end of the housing body so as to define an accommodating space therebetween, the accommodating space being adapted to contain the monitoring device;

a transparent plate disposed fixedly within the housing body and located behind and adjacent to the inward flange, the transparent plate having opposite front and rear side surfaces, as well as an outer periphery that is in contact with an annular inner surface of the housing body;

an annular water seal disposed within the annular groove in the inward flange of the housing body and in contact with the groove-defining wall of the inward flange and an outer peripheral portion of the front side surface of the transparent plate so as to establish a watertight seal between the transparent plate and the annular inner surface of the housing body; and an annular cover disposed fixedly and fittingly within the inward flange of the housing body and having an annular rear end in contact with the front side surface of the transparent plate and disposed in proximity to the water seal for covering the water seal.

Since no gap is formed between the inward flange and the transparent plate, algae growth on the front side surface of the transparent plate can be prevented.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
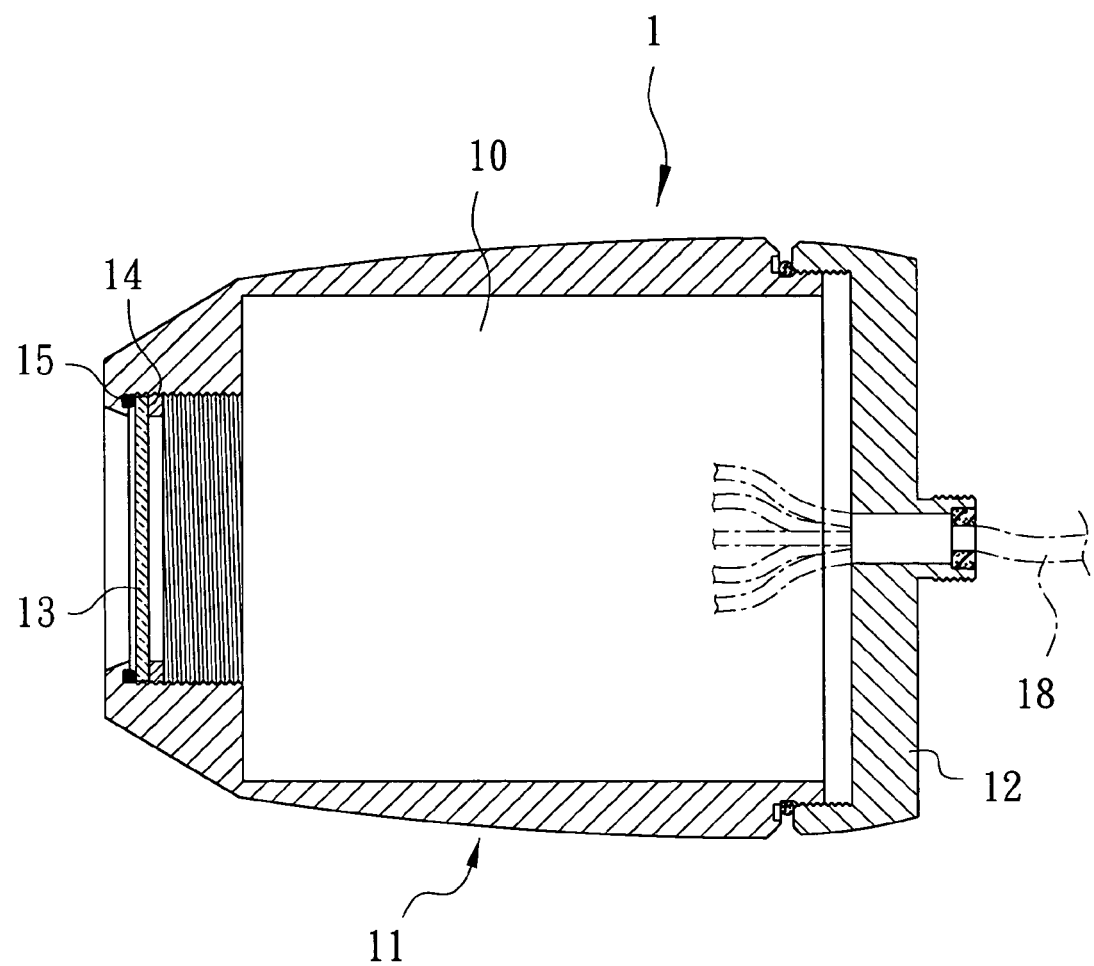
FIG. 1 is a sectional view of a conventional underwater housing for containing a photographic camera.
Figure 2:
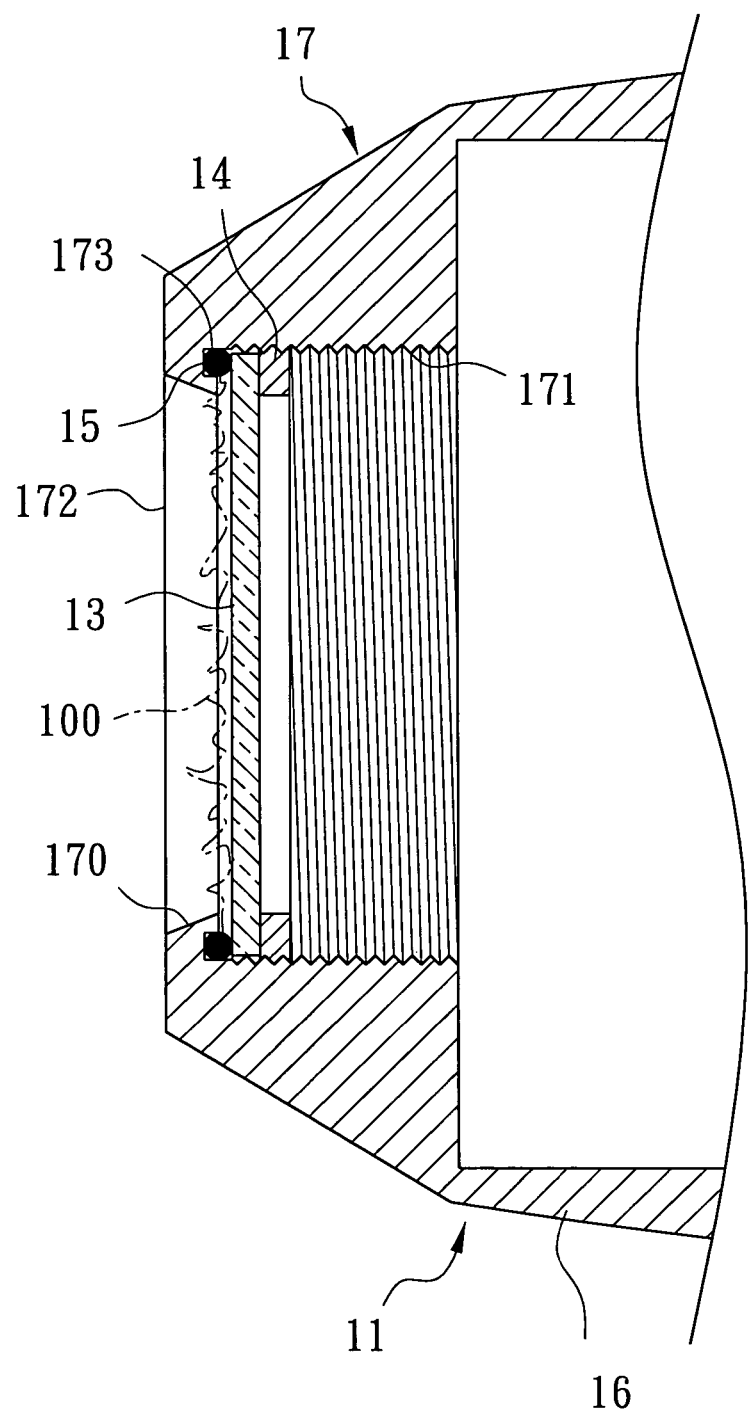
FIG. 2 is a fragmentary sectional view of the conventional underwater housing, illustrating algae growth between an inward flange of a housing body and a transparent plate.

Before the present invention is described in greater detail in connection with the preferred embodiments, it should be noted that similar elements and structures are designated by like reference numerals throughout the entire disclosure.

Figure 3:
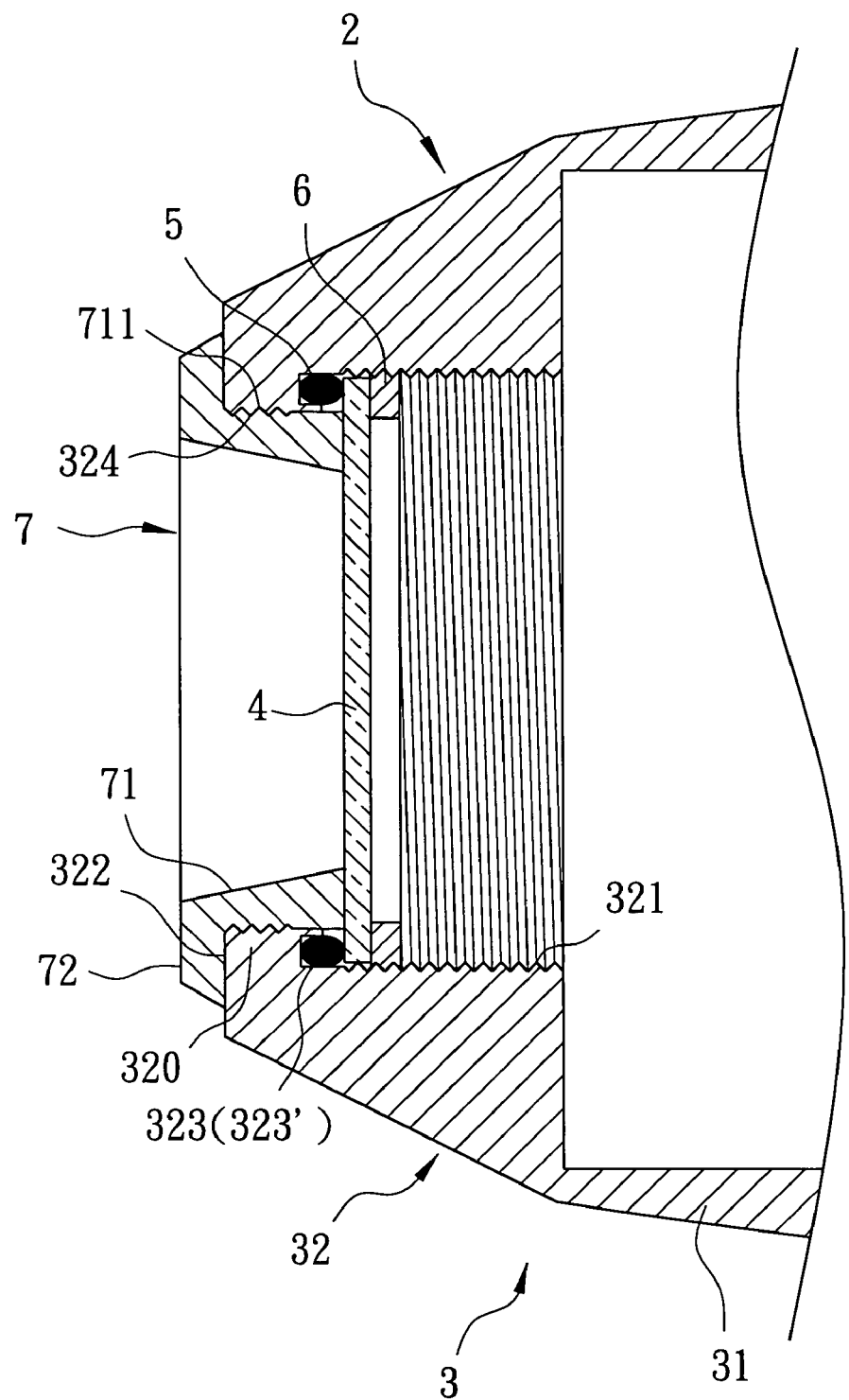
FIG. 3 is a fragmentary sectional view of the first preferred embodiment of an underwater housing for containing a monitoring device according to this invention.
Figure 4:
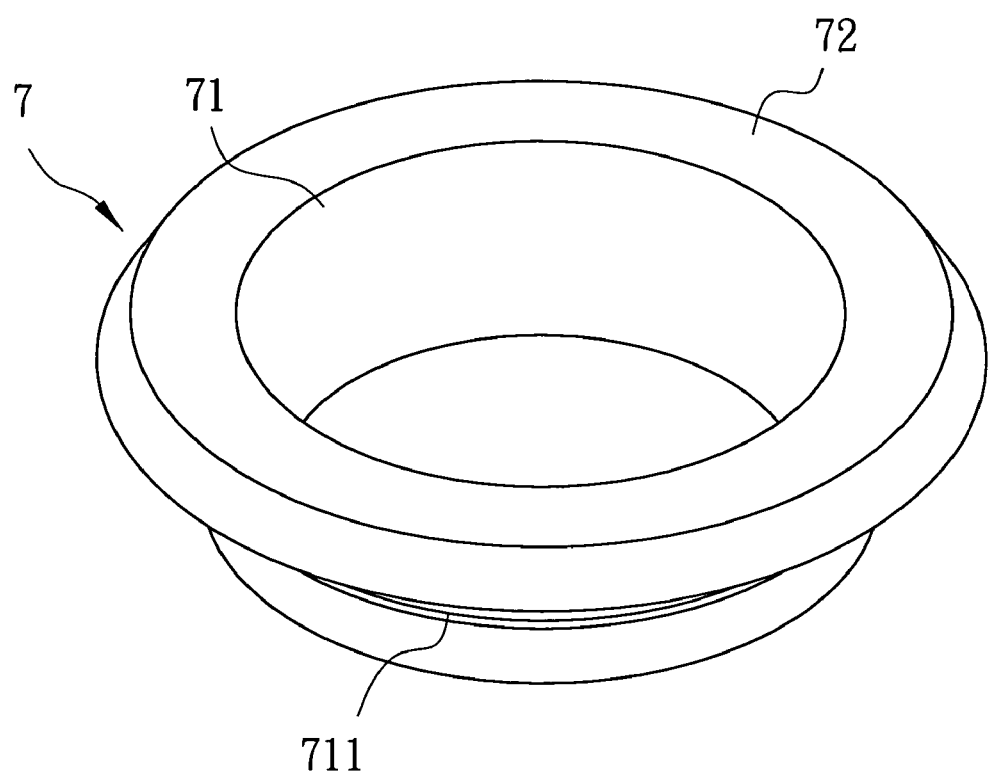
FIG. 4 is a perspective view of an annular cover of the first preferred embodiment.

Referring to FIGS. 3 and 4, the first preferred embodiment of an underwater housing 2 for containing a monitoring device (not shown) includes a tubular housing body 3, a seal cap (not shown), a transparent plate 4, an annular water seal 5, a positioning member 6, and an annular cover 7 made of stainless. In this embodiment, the monitoring device is configured as a photographic camera that may be used for a long period at a signal, set location.

The housing body 3 has a surrounding wall 31 and an annular front end wall 32 formed with an internally threaded portion 321. The monitoring device is disposed within the surrounding wall 31. An inward flange 320 extends radially and inwardly from an open front end of the front end wall 32, and has a rear side surface formed with an annular groove 323. The annular groove 323 is defined by a groove-defining wall 323'. The positioning member 6 has an externally threaded outer periphery engaging the internally threaded portion 321 of the housing body 3.

The seal cap is connected fixedly to the rear end of the housing body 3 in a know manner so as to define an accommodating space for receiving the monitoring device.

The transparent plate 4 is disposed fixedly within the housing body 3, and is located behind and adjacent to the inward flange 320. The transparent plate 4 has opposite front and rear side surfaces, as well as an outer periphery that is in contact with an annular inner surface of the housing body 3.

The water seal 5 is disposed within the annular groove 323 in the inward flange 320 of the housing body 3, and is in contact with the groove-defining wall 323' of the inward flange 320 and an outer peripheral portion of the front side surface of the transparent plate 4 so as to establish a watertight seal between the transparent plate 4 and the annular inner surface of the housing body 3.

The annular cover 7 is disposed fixedly and fittingly within the inward flange 320 of the housing body 3, and has an annular rear end in contact with the front side surface of the transparent plate 4 and disposed in proximity to the water seal 5 for covering the water seal 5.

In this embodiment, the inward flange 320 of the housing body 3 has an internally threaded inner periphery, and the annular cover 7 has an insert portion 71 and an outward flange 72 extending radially and outwardly from a front end of the annular cover 7. The insert portion 71 has an externally threaded portion 711 engaging the internally threaded inner periphery of the inward flange 320 so as to fix the annular cover 7 within the inward flange 320. The transparent plate 4 is clamped between the positioning member 6 and the annular cover 7.

The outward flange 72 of the annular cover 7 has a flat rear side surface abutting against an annular flat front end surface 322 of the housing body 3.

Figure 5:
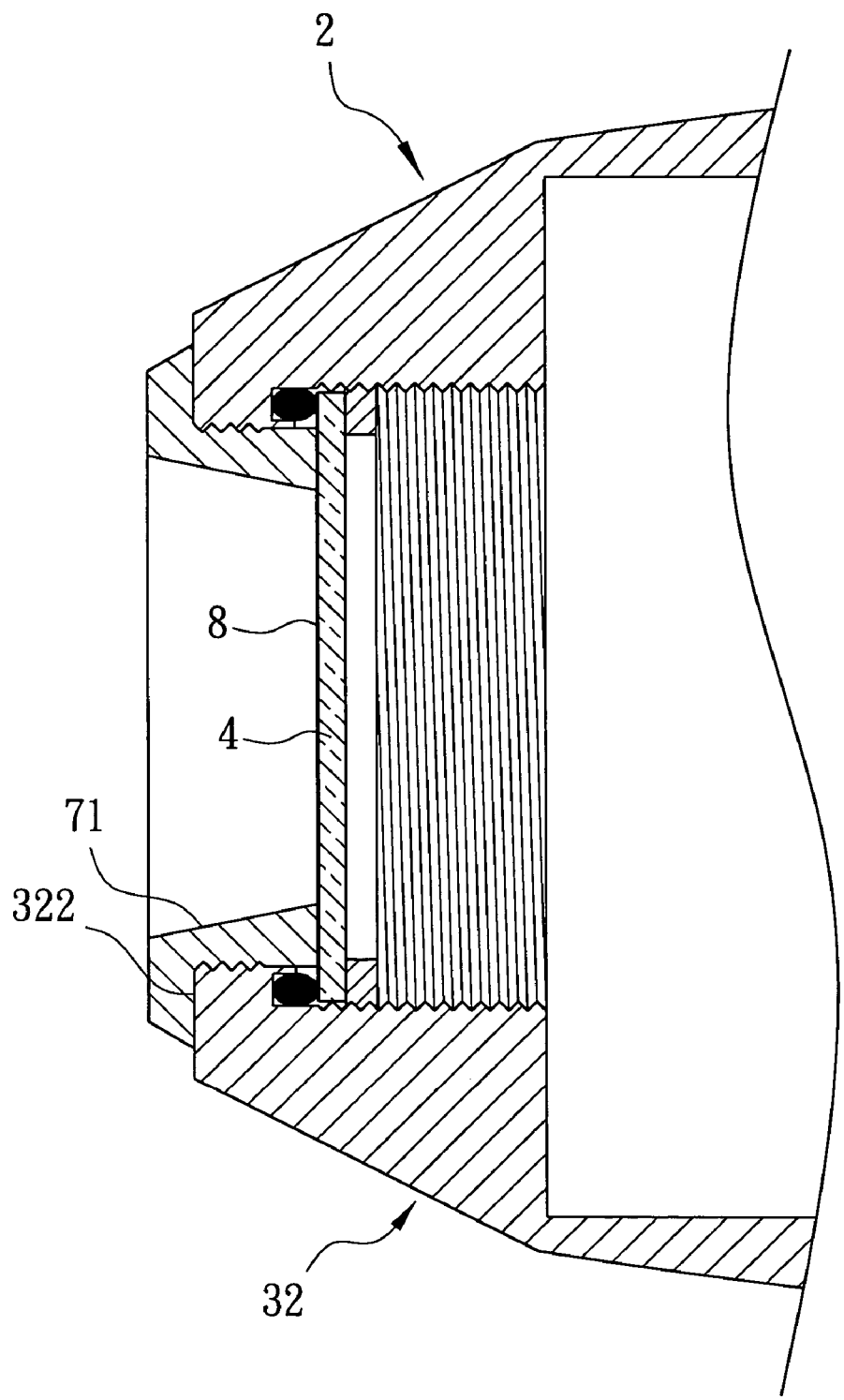
FIG. 5 is a fragmentary sectional view of the second preferred embodiment of an underwater housing for containing a monitoring device.

Referring to FIG. 5, preferably, a transparent protective film 8 is adhered to the front side surface of the transparent plate 4.

Since no gap is formed between the inward flange 320 and the transparent plate 4, algae growth on the front side surface of the transparent plate 4 can be prevented.

With this invention thus explained, it is apparent that numerous modifications and variations can be made without departing from the scope and spirit of this invention. It is therefore intended that this invention be limited only as indicated by the appended claims.

We claim:

1. An underwater housing for containing a monitoring device comprising:
   a tubular housing body having an annular inner surface, and an open front end formed with an inward flange extending radially and inwardly therefrom, said inward flange having a rear side surface formed with an annular groove defined by a groove-defining wall, and said tubular housing further having an open rear end, said groove-defining wall forming a portion of said annular inner surface of said housing body;
   a seal cap connected fixedly to said rear end of said housing body so as to define an accommodating space within said housing body, said accommodating space being adapted to contain said monitoring device;
   a transparent plate disposed fixedly within said housing body and located behind and adjacent to said inward flange, said transparent plate having opposite front and rear side surfaces, as well as an outer periphery that is in contact with an annular inner surface of said housing body;
   an annular water seal disposed within said annular groove in said inward flange of said housing body and in front of said transparent plate and in contact with said groove-defining wall of said inward flange and an outer peripheral portion of said front side surface of said transparent plate so as to establish a watertight seal between said transparent plate and said annular inner surface of said housing body; and
   an annular cover disposed fixedly and fittingly within said inward flange of said housing body and having an annular rear end in contact with said front side surface of said transparent plate and disposed in proximity to said water seal for covering said water seal, said water seal being disposed around said annular rear end of said annular cover.

2. The underwater housing as claimed in claim 1, wherein said inward flange of said housing body has an internally threaded inner periphery, said annular cover having an externally threaded portion engaging said internally threaded inner periphery of said inward flange so as to fix said annular cover within said inward flange.

3. The underwater housing as claimed in claim 2, wherein said annular inner surface of said housing body has a threaded portion, said underwater housing further comprising a positioning member having an externally threaded outer periphery engaging said threaded portion of said annular inner surface of said housing body, said transparent plate being clamped between said positioning member and said annular cover.

4. The underwater housing as claimed in claim 2, wherein said housing body has an annular flat front end surface, said annular cover being formed with an outward flange extending radially and outwardly from a front end thereof, said outward flange having a flat rear side surface abutting against said front end surface of said housing body.

5. The underwater housing as claimed in claim 1, further comprising a transparent protective film adhered to said front side surface of said transparent plate.

* * * * *